(12) United States Patent
Natsume

(10) Patent No.: US 7,791,537 B2
(45) Date of Patent: Sep. 7, 2010

(54) RADIO MONITORING APPARATUS AND METHOD

(75) Inventor: Naoki Natsume, Tokyo (JP)

(73) Assignee: NEC Corporation, Tokyo (JP)

( * ) Notice: Subject to any disclaimer, the term of this patent is extended or adjusted under 35 U.S.C. 154(b) by 49 days.

(21) Appl. No.: 11/686,202

(22) Filed: Mar. 14, 2007

(65) Prior Publication Data

US 2007/0229354 A1    Oct. 4, 2007

(30) Foreign Application Priority Data

Mar. 14, 2006    (JP) .............................. 2006-068957

(51) Int. Cl.
*G01S 5/02*    (2010.01)
*G01S 3/02*    (2010.01)

(52) U.S. Cl. ....................... 342/417; 342/450
(58) Field of Classification Search .................. 342/417
See application file for complete search history.

(56) References Cited

U.S. PATENT DOCUMENTS

| | | | | |
|---|---|---|---|---|
| 3,919,479 | A | * | 11/1975 | Moon et al. .................. 704/237 |
| 5,945,947 | A | * | 8/1999 | Cunningham ............... 342/442 |
| 6,147,646 | A | * | 11/2000 | Arneson et al. ............. 342/417 |
| 2002/0089449 | A1 | * | 7/2002 | Fox ............................ 342/417 |
| 2004/0160363 | A1 | | 8/2004 | Powers et al. |
| 2006/0163349 | A1 | * | 7/2006 | Neugebauer ................. 235/383 |

FOREIGN PATENT DOCUMENTS

| | | | |
|---|---|---|---|
| JP | 08-233882 | A | 9/1996 |
| JP | 9-211039 | | 8/1997 |
| JP | 09-321718 | A | 12/1997 |
| JP | 2003-322667 | A | 11/2003 |
| JP | 2004-040168 | A | 2/2004 |
| JP | 2004-214917 | A | 7/2004 |
| JP | 2006-211250 | | 8/2006 |
| JP | 2006211241 | A * | 8/2006 |

* cited by examiner

*Primary Examiner*—Gregory C Issing
(74) *Attorney, Agent, or Firm*—Dickstein Shapiro LLP

(57) ABSTRACT

Disclosed is radio monitoring apparatus which includes a radio station distinction unit, a direction measurement unit, a transmission source location estimation unit and a transmission source location classification unit. The radio station distinction unit outputs radio station distinction information for uniquely discriminating a radio station that is a transmission source of a transmitted signal from a received signal. The direction measurement unit measures an arrival direction of the transmitted signal. The transmission source location estimation unit estimates a location of the transmission source from results of the direction measurement and outputs an estimated location as transmission source location information. The transmission source location classification unit relates the radio station distinction information and the transmission source location information and outputs them.

14 Claims, 4 Drawing Sheets

RADIO MONITORING APPARATUS AND METHOD

BACKGROUND OF THE INVENTION

1. Field of the Invention

The present invention relates to a radio monitoring technology for monitoring usage of a radio wave.

2. Description of the Related Art

In recent years, a mobile phone and a personal wireless device, etc. become popular. Short-distance communication such as a wireless LAN system using wireless system has been also spreading. For this reason, frequency allocation for various wireless communications is approaching a limit. On the other hand, a wireless communication is important communication resources used by public organizations and also used for a communication in case of disaster and emergency. Therefore, a technology for monitoring a state of use of a radio wave and technology for identifying a transmission source transmitting an unauthorized radio wave have been needed.

For example, JP-A-1997-211039 discloses a radio station distinction apparatus for distinguishing a radio station. This apparatus includes a down converter, a digital spectrum analyzer and a calculation unit. The down converter converts a received signal into an intermediate frequency signal. The digital spectrum analyzer converts this intermediate frequency signal into digital frequency component data. The calculation unit calculates change pattern information of a center frequency of this digital frequency component data.

This radio station distinction apparatus previously calculates the change pattern information of a center frequency of the digital frequency component data for each known radio station and stores the calculation result in the apparatus.

The calculation unit calculates a degree of similarity between received signal change pattern information and change pattern information of a plurality of known radio stations. Then, the calculation unit recognizes a radio station with the highest degree of similarity as a radio station having transmitted this received signal.

The apparatus disclosed in JP-A-1997-211039 can distinguish a model of a radio station which is a transmission source of a radio wave and a mobile station itself. However, JP-A-1997-211039 does not disclose a mechanism to know a location of the radio station thus distinguished. Accordingly, even if a model of a radio station and a mobile station itself are distinguished, a location of the radio station is unknown. Therefore, a location of a radio station for monitoring cannot be traced. Even if the technology disclosed in JP-A-1997-211039 is used in combination with the transmitting location identification technology, an observer is required to use both the technologies disclosed in JP-A-1997-211039 and the transmitting location identification technology simultaneously for monitoring. Generally, it is not guaranteed that a mobile station A identified by the technology disclosed in JP-A-1997-211039 and a mobile station B existing at a location identified by using the transmitting location identification technology are identical. Accordingly, an observer needs to continue monitoring, while confirming that the mobile station A and the mobile station B are identical. Therefore, observer's burden increases. It also means that when an observer is absent, monitoring can not be performed.

SUMMARY OF THE INVENTION

The first exemplary feature of the invention provides a radio monitoring technology which can easily trace a location of a radio station for monitoring even when an observer is absent.

A first exemplary aspect of the invention provides a radio monitoring apparatus which includes: a radio station distinction unit for outputting radio station distinction information for uniquely discriminating a radio station that is a transmission source of a transmitted signal from a received signal; a direction measurement unit for measuring an arrival direction of the transmitted signal; a transmission source location estimation unit for estimating a location of the transmission source from measurement results of the direction measurement units, and outputting the estimated location as transmission source location information; and a transmission source location classification unit for relating the radio station distinction information and the transmission source location information, and outputting them.

The first exemplary aspect of the invention estimates a location of a transmission source for monitoring which has transmitted a signal and also generates radio station distinction information for discrimination of each radio station. The first exemplary aspect of the invention relates the radio station distinction information and the location of the transmission source, and outputs them. Therefore, the first exemplary aspect of the invention does not lose a radio station for monitoring.

BRIEF DESCRIPTION OF THE DRAWINGS

The above and other objects, features and advantages of the present invention will become apparent from the following detailed description when taken with the accompanying drawings in which.

DETAILED DESCRIPTION OF THE EXEMPLARY EMBODIMENTS

Next, an exemplary embodiment of the present invention is described with reference to drawings.

First Exemplary Embodiment

Figure 1:
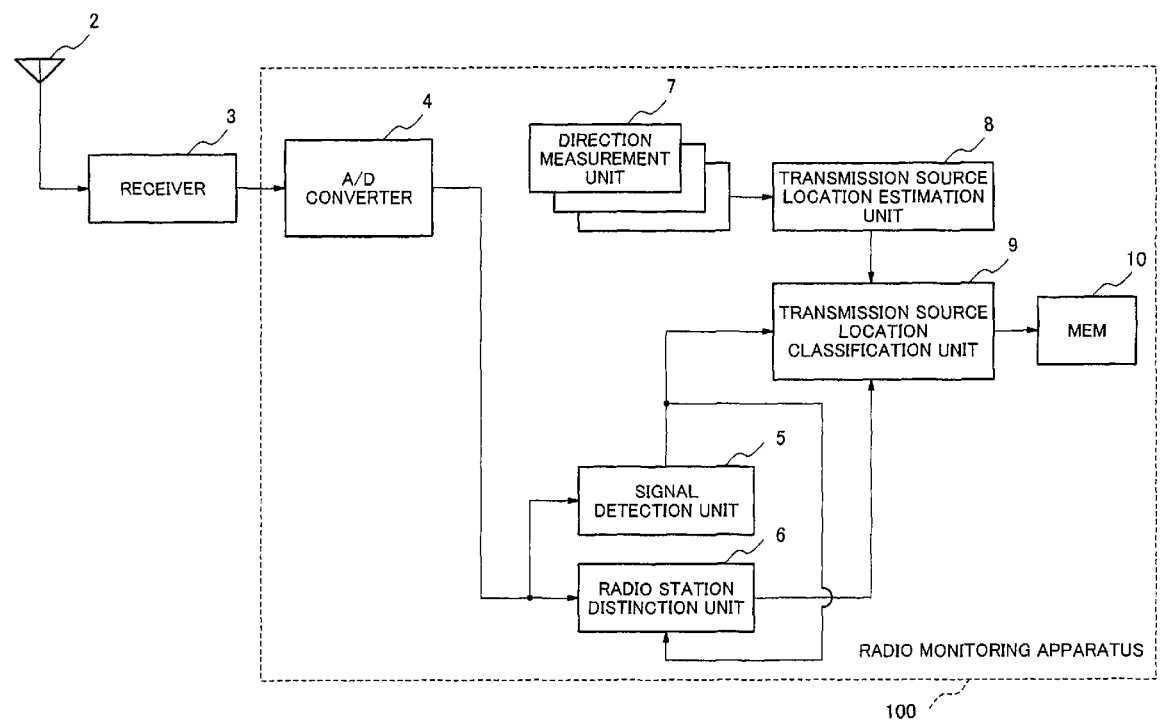
FIG. 1 is a block diagram showing a construction of a radio monitoring apparatus according to a first exemplary embodiment of the present invention.

FIG. 1 is a block diagram showing a construction of a radio monitoring apparatus according to a first exemplary embodiment of the present invention.

As shown in FIG. 1, a radio monitoring apparatus 100 according to the exemplary embodiment comprises an A/D converter 4, a signal detection unit 5, a radio station distinction unit 6, a direction measurement unit 7, a transmission source location estimation unit 8, and a transmission source location classification unit 9. The radio monitoring apparatus 100 is connected to a receiver 3 having an antenna 2.

The, receiver 3 converts a radio signal received by the antenna 2 into an intermediate frequency band signal. The A/D converter 4 converts the intermediate frequency band signal outputted from the receiver 3 into a digital complex envelope signal.

The signal detection unit 5 detects a presence of a received signal from the digital complex envelope signal outputted from the A/D converter 4. When starting detecting the received signal, the signal detection unit 5 notifies the radio station distinction unit 6 of transmission start information. When the received signal is not detected any more, the signal detection unit 5 notifies the transmission source location classification unit 9 of transmission end information. For example, in case that a radio station for monitoring is a mobile station conforming to a well-known press-to-talk system, a time when a press switch is turned on corresponds to a time of a transmission start and a time when the press switch is turned off corresponds to a time of a transmission end. In this exemplary embodiment, if a monitoring target is only a mobile station conforming to a press-to-talk system, a location of a transmission source (radio station) of a transmitted signal, a model and a mobile station itself are identified (distinguished) from a signal transmitted during a time period defined by the turning on and the turning off of the press switch of the mobile station (the time period is referred as press unit).

When the transmission start information is delivered from the signal detection unit 5, the radio station distinction unit 6 detects radio station distinction information from the digital complex envelope signal outputted from the A/D converter 4 and notifies the transmission source location classification unit 9 of the radio station distinction information. This radio station distinction information is information for uniquely identifying a radio station as the transmission source.

Because a content processed by this radio station distinction unit 6 is disclosed in the above JP-A-1997-211039 and JP-A-2006-211250, a detailed description is omitted.

Further, by using a technology disclosed in JP-A-2006-211250, a fluctuation pattern of a frequency of a received signal transmitted from a mobile station is detected. A degree of similarity between the detected fluctuation pattern and the fluctuation pattern being already registered is calculated, thereby the radio station distinction information being outputted.

Radio station distinction technology disclosed in JP-A-1997-211039 has been already explained. Description of these documents are incorporated herein by reference in its entirety.

Upon receipt of a signal, the direction measurement unit 7 measures its arrival direction (referred to below as transmission source direction). The radio monitoring apparatus 100 according to this exemplary embodiment includes at least two direction measurement units 7. The direction measurement units are installed at different locations, respectively. Installation location information of a plurality of direction measurement units 7 is registered in the transmission source location estimation unit 8 in advance. Further, one of receiving antennas for direction measurement units may be in common with the receiving antenna 2.

The transmission source location estimation unit 8 receives measured transmission source directional information from the plurality of direction measurement units 7. The transmission source location estimation unit 8 calculates an intersection point of a plurality of transmission source directions, that is a location of a transmission source, based on the installation location information of the direction measurement unit 7 that is registered in advance and the measured transmission source directional information. The transmission source location estimation unit 8 notifies the transmission source location classification unit 9 of location information indicating a location of the transmission source.

The transmission source location classification unit 9 relates the radio station distinction information indicating a radio station that is the transmission source and the transmission source location information estimated by the transmission source location estimation unit 8. The transmission source location classification unit 9 stores location information for each radio station in a memory unit 10. It goes without saying that an observer is able to view a content of this memory unit 10. When storing the location information in the memory unit 10, the transmission source location classification unit 9 may store time information (that is, information indicating a reception time) in the memory unit together. Consequently, in this exemplary embodiment, it is possible to monitor and trace a radio station for monitoring even if the observer is absent.

Here, the transmission source location classification unit 9 may average in time direction with respect to the estimated transmission source location information corresponding to a radio station indicated by the radio station distinction information and store the result of averaging in the memory unit together with the time information.

Further, an estimation method of a transmission source direction and an estimation method of a transmission source location using a plurality of transmission source directions are well-known for a person skilled in the art. Accordingly, a detailed description of the well-known technologies is omitted.

Next, operation of the radio monitoring apparatus 100 according to the first exemplary embodiment is described with reference to FIG. 2.

Figure 2:
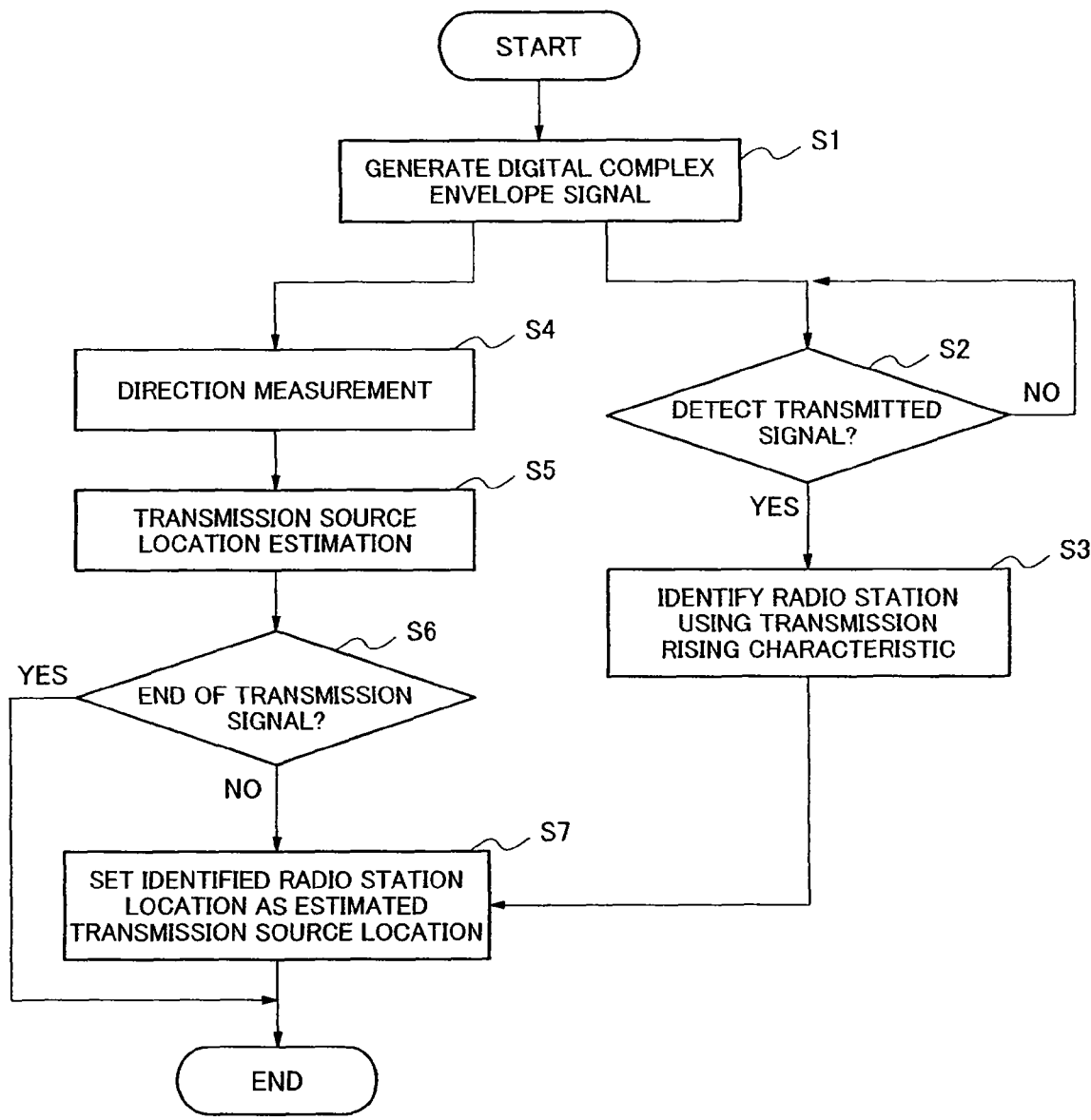
FIG. 2 is a flowchart showing operation of a radio monitoring apparatus shown in FIG. 1.

FIG. 2 is a flowchart illustrating a whole operation of the radio monitoring apparatus shown in FIG. 1.

As shown in FIG. 2, when an intermediate frequency signal is supplied from the receiver 3, the radio monitoring apparatus 100 according to the first exemplary embodiment converts the intermediate frequency signal into a digital complex envelope signal using the A/D converter 4 (Step S1).

Next, the signal detection unit 5 in the radio monitoring apparatus 100 judges whether or not a transmitted signal is included in the digital complex envelope signal outputted from the A/D converter 4 (Step S2). When detecting the transmitted signal, the signal detection unit 5 notifies the radio station distinction unit 6 of transmission start information. Additionally, when detecting an absence of the transmitted signal in the digital complex envelope signal, the signal detection unit 5 notifies the transmission source location classification unit 9 of transmission end information. Further, the radio station distinction unit 6 is also notified of this transmission end information. Upon receipt of this notification, the radio station distinction unit 6 stops its operation until the next transmission start information is delivered.

The radio station distinction unit 6 distinguishes a radio station that is the transmission source, for example, by calculating a degree of similarity between a measured rising characteristic of the transmitted signal and a rising characteristic of a known transmitted signal. Then, the radio station distinction unit 6 notifies the transmission source location classification unit 9 of the radio station distinction information indicating a model and a mobile station itself of a radio station that is a transmission source of the transmitted signal (Step S3).

The radio monitoring apparatus 100 measures an arrival direction of a received radio wave (transmission source direction) for each predetermined period using the plurality of direction measurement units 7 and notifies the transmission source location estimation unit 8 of information on the measured transmission source direction (Step S4).

On the other hand, the transmission source location estimation unit 8 calculates an intersection point of transmission source directions from the information on a transmission source direction received from the plurality of direction measurement units 7 and installation location information of each direction measurement unit 7. The transmission source location estimation unit 8 notifies the transmission source location classification unit 9 of the intersection point as a location of the transmission source (Step S5).

Upon receipt of the transmission source location information from the transmission source location estimation unit 8, the transmission source location classification unit 9 judges whether or not the transmission end information is delivered from the signal detection unit 5 (Step S6). When the transmission end information is not delivered, the transmission source location classification unit 9 judges that a location of a radio station indicated by the radio station distinction information received from the radio station distinction unit 6 is a location of the transmission source received from the transmission source location estimation unit 8. Then, the transmission source location classification unit 9 relates the radio station distinction information and the transmission source location information received from the transmission source location estimation unit 8 and outputs the radio station distinction information to the memory unit 10 (Step S7). A process of this Step S7 is performed until corresponding transmission end information is delivered from the signal detection unit 5.

A radio station generally communicates with one or more other radio stations. Here, a case of a communication between radio stations over a short distance will be considered. In case that a location of a radio station is estimated by a radio monitoring apparatus using well-known technology mentioned above, an average direction or an average location of a plurality of radio stations are calculated by using the well-known technology. Accordingly, an accuracy of a location estimation with respect to a radio station for monitoring is degraded.

Since a plurality of radio stations can freely move, it may happen that moving direction of each radio station crosses each other during they are moving. At that time, there is a possibility that a radio station for monitoring is not distinguished as the monitoring target after crossing moving direction of other radio station and after then, the other radio station is traced. (so-called transfer problem)

However, the radio monitoring apparatus 100 according to this exemplary embodiment estimates a transmission source location, distinguishes each radio station by the radio station distinction unit 6, relates a measured transmission source location and a distinguished radio station, and records them. Therefore, using this exemplary embodiment, a radio station for monitoring can be traced easily without losing it even if an observer is absent.

In this exemplary embodiment, since a radio station for monitoring is discriminated based on a radio station distinction information, the transfer problem mentioned above does not occur.

In an apparatus that is modified from the radio monitoring apparatus 100 according to this exemplary embodiment, an average value of locations corresponding to an identical radio station distinction information obtained by a predetermined number of times of estimations set in advance or within a predetermined time period set in advance is set as transmission source location information of the corresponding radio station. By this modified apparatus, a higher accuracy can be obtained for a location estimation with respect to a radio station for monitoring.

Second Exemplary Embodiment

Next, description will be made of a second exemplary embodiment of the present invention using a drawing.

Figure 3:
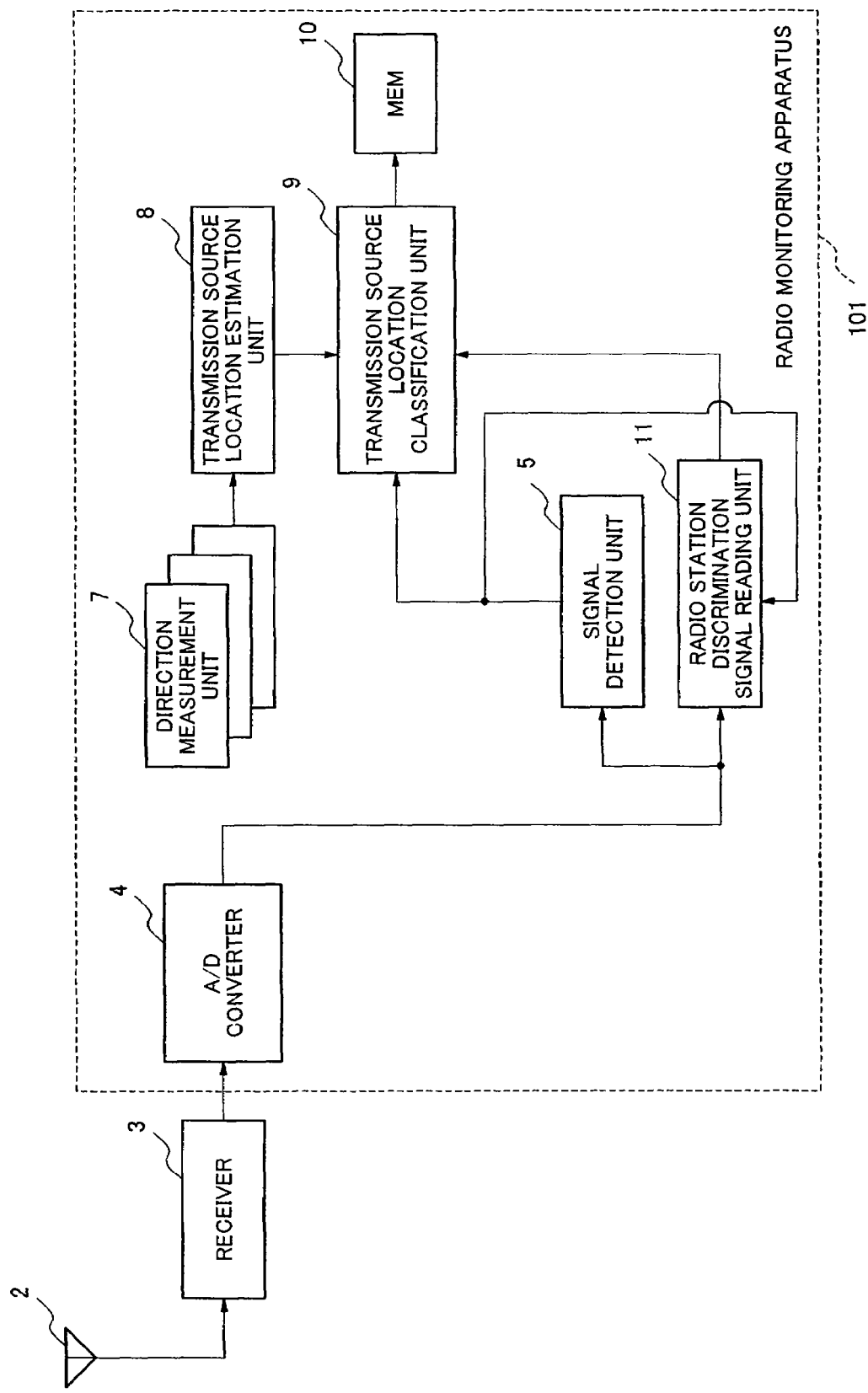
FIG. 3 is a block diagram showing a construction of a radio monitoring apparatus according to a second exemplary embodiment of the present invention.

FIG. 3 is a block diagram showing a construction of a radio monitoring apparatus according to the second exemplary embodiment of the present invention.

As shown in FIG. 3, a radio monitoring apparatus 101 according to the second exemplary embodiment comprises a radio station discrimination signal reading unit 11 in substitution for the radio station distinction unit 6 shown in FIG. 1.

A certain model of a radio station transmits a radio station discrimination signal including information for discriminating a radio station. For example, a personal wireless device transmits a radio station discrimination signal called as ATIS (Automatic Transmitter Identification System). For this kind of radio station, the radio monitoring apparatus can discriminate a radio station that is a transmission source by using a radio station discrimination signal reading unit 11 shown in FIG. 3.

Upon receipt of transmission start information from the signal detection unit 5, the radio station discrimination signal reading unit 11 extracts a radio station discrimination signal from a digital complex envelope signal supplied from the A/D converter 4 in the same manner as the radio station distinction unit 6 shown in FIG. 1. The radio station discrimination signal reading unit 11 identifies a radio station that is a transmission source based on this radio station discrimination signal. The radio station discrimination signal reading unit 11 notifies a transmission source location classification unit of radio station distinction information for uniquely discriminating a radio station that is a transmission source. Because other configuration is the same as that of the first exemplary embodiment, overlapping description is omitted.

Next, operation of a radio monitoring apparatus 200 according to the second exemplary embodiment is described with reference to FIG. 4.

Figure 4:
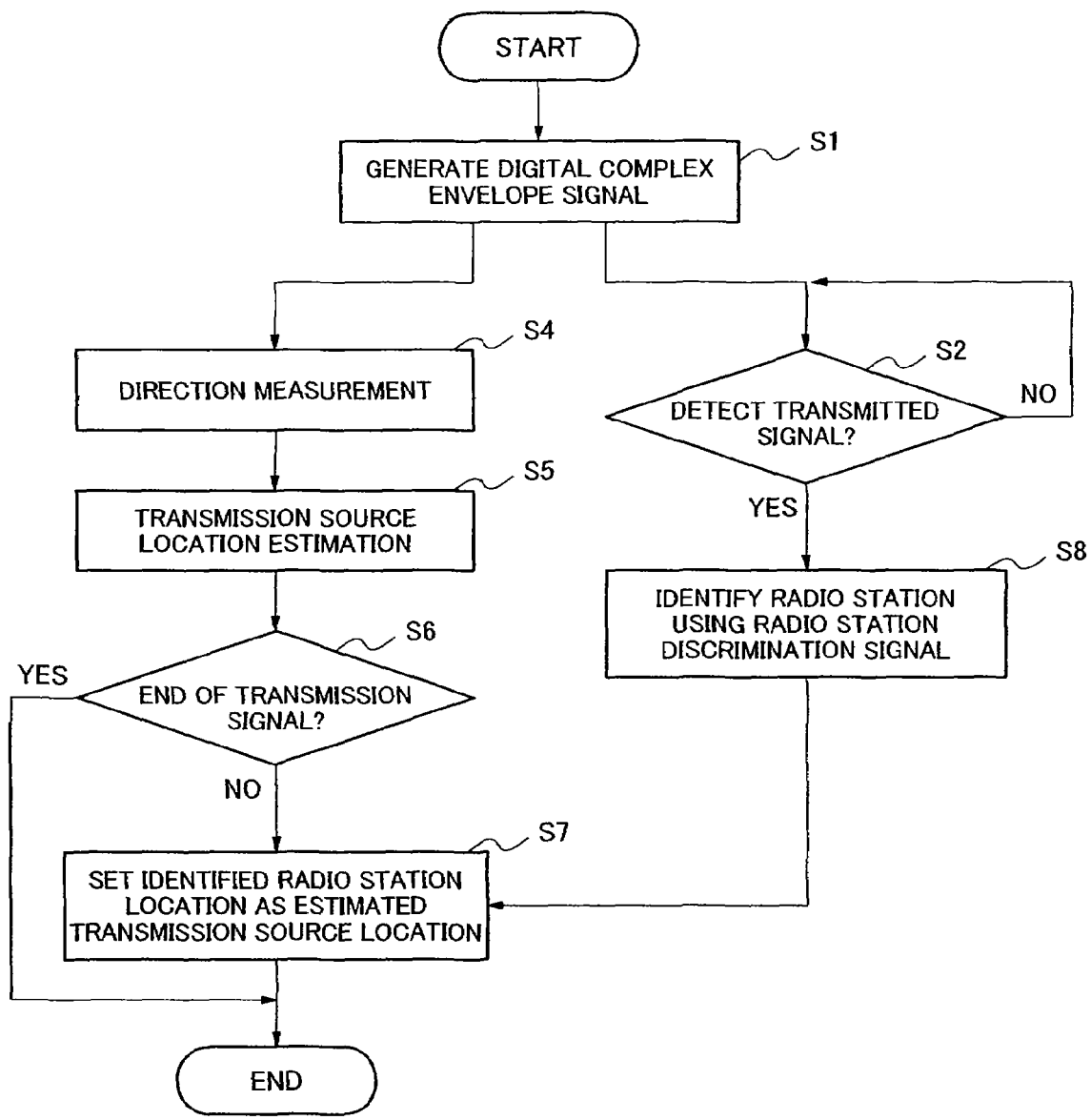
FIG. 4 is a flowchart showing operation of a radio monitoring apparatus shown in FIG. 3.

FIG. 4 is a flowchart showing operation of a radio monitoring apparatus shown in FIG. 3.

In FIG. 4, step S3 in FIG. 2 is changed for step S8 as it is clear from a comparison between FIG. 2 and FIG. 4. Because a processing content at other steps in FIG. 4 is the same as that of FIG. 2, overlapping description is omitted.

In step S8, the radio station discrimination signal reading unit 11 extracts a radio station discrimination signal from a digital complex envelope signal outputted from an A/D converter. The radio station discrimination signal reading unit 11 identifies a radio station that is a transmission source based on the radio station discrimination signal. The radio station discrimination signal reading unit 11 notifies a transmission source location classification unit of radio station distinction information for discriminating a radio station that is an identified transmission source (step S8).

The radio monitoring apparatus 101 according to the second exemplary embodiment measures a transmission source direction and a transmission source location by a plurality of direction measurement units and a transmission source location estimation unit, and also distinguishes each radio station based on a radio station discrimination signal extracted by the radio station discrimination signal reading unit 11. The radio monitoring apparatus 101 relates a radio station indicated by radio station distinction information and an estimated location of a corresponding transmission source and outputs the result. Thus, the radio monitoring apparatus 101 can trace a radio station for monitoring easily without losing it.

While this invention has been described in connection with certain exemplary embodiments, it is to be understood that the subject matter encompassed by way of this invention is not be limited to those specific embodiments. On the contrary, it is intended for the subject matter of the invention to include all alternatives, modifications and equivalents as can be included with the spirit and scope of the following claims. Further, the inventor's intent is to retain all equivalents even if the claims are amended during prosecution.

What is claimed is:

1. A radio monitoring apparatus, comprising:
    a radio station distinction unit for outputting radio station distinction information, based on a degree of similarity between a measured rising characteristic of a transmitted signal and a rising characteristic of a known transmitted signal, for uniquely discriminating a radio station that is a transmission source of said transmitted signal from a received signal;
    a plurality of direction measurement units for measuring an arrival direction of said transmitted signal;
    a transmission source location estimation unit for estimating a location of said identified transmission source from a measurement result of said direction measurement units, and outputting the estimated location as transmission source location information; and
    a transmission source location classification unit for relating said radio station distinction information to said transmission source location information, and outputting them.

2. The radio monitoring apparatus according to claim 1, further comprising:
    a memory unit for storing an output of said transmission source location classification unit.

3. The radio monitoring apparatus according to claim 2, wherein said transmission source location classification unit stores information indicating current time in said memory unit, in addition to said radio station distinction information and said transmission source location information.

4. The radio monitoring apparatus according to claim 1, wherein said radio station distinction unit extracts a pattern indicating a characteristic of the transmitted signal- and outputs said radio station distinction information based on this extracted pattern.

5. The radio monitoring apparatus according to claim 1, wherein said radio station distinction unit extracts a radio station discrimination signal from said transmitted signal and outputs the signal as said radio station distinction information.

6. The radio monitoring apparatus according to claim 1, further comprising:
    a detection unit for detecting a start of said transmitted signal from a received signal and outputting a transmission start signal for activating said radio station distinction unit.

7. The radio monitoring apparatus according to claim 1, wherein said transmission source location classification unit outputs an average value of transmission source locations which are estimated multiple times by said transmission source location estimation unit as said transmission source location information.

8. A radio monitoring method comprising the steps of:
    (A) outputting radio station distinction information, based on a degree of similarity between a measured rising characteristic of a transmitted signal and a rising characteristic of a known transmitted signal, for uniquely discriminating a radio station that is a transmission source of the transmitted signal from a received signal;
    (B) measuring an arrival direction of said transmitted signal using a plurality of direction measuring units, estimating a location of said identified transmission source from a measurement result of the direction measurement units and outputting the estimated location as transmission source location information; and
    (C) relating said radio station distinction information to said transmission source location information, and outputting them.

9. The radio monitoring method according to claim 8, wherein in said step (C), an output of said transmission source location classification unit is stored in a memory unit.

10. The radio monitoring method according to claim 9, wherein in said step (C), information indicating current time is stored in said memory unit in addition to said radio station distinction information and said transmission source location information.

11. The radio monitoring method according to claim 8, wherein in said step (A), a pattern that indicates a characteristic of said transmitted signal is extracted and said radio station distinction information is outputted based on this extracted pattern.

12. The radio monitoring method according to claim 8, wherein in said step (A), a radio station discrimination signal is extracted from said transmitted signal, and the extracted signal is outputted as said radio station distinction information.

13. The radio monitoring method according to claim 8, further comprising:
    a step for detecting a start of said transmitted signal from a received signal, and outputting a transmission start signal which activates a process of said step (A).

14. The radio monitoring method according to claim 8, wherein in said step (C), an average value of transmission source locations which are estimated multiple times by said transmission source location estimation unit is outputted as said transmission source location information.

* * * * *